United States Patent Office 2,823,235
Patented Feb. 11, 1958

2,823,235

HYDROGENATION OF NITRO COMPOUNDS TO AMINES AND CATALYST THEREFOR

Donald Penrose Graham, Lindamere, Wilmington, Del., and Louis Spiegler, Woodbury, N. J., assignors to E. I. du Pont de Nemours and Company, Wilmington, Del., a corporation of Delaware No Drawing. Application May 10, 1955
Serial No. 507,476

14 Claims. (Cl. 260—580)

This invention is directed to the preparation of improved hydrogenation catalysts and their use in catalytic hydrogenations. The catalysts of this invention result in greatly improved hydrogenation rates and require lower catalyst concentration in systems wherein an organic compound is reduced. Such catalysts give increased yields and less tar formation than known catalysts.

Catalytic hydrogenation is commonly used in the reduction of aromatic and aliphatic nitro compounds to amines, in the conversion of acids, esters and ketones to alcohols and in the hardening of fats. It is desirable to achieve a high production rate at minimum costs; however, this result can only be realized if the rate of hydrogenation is greatly increased without requiring a corresponding high concentration of expensive noble metal catalyst.

It is known that hydrogenation rates are greatly influenced by the catalyst, catalyst activators or poisons that might be present, catalyst support if one is used, temperature, pressure, solvent, agitation and other conditions specific to the particular process involved. In conventional processes, these factors are considered and optimum conditions selected. One disadvantage inherent in the hydrogenation catalysts used heretofore is that they often become fouled by the products formed. When the object of catalytic hydrogenation is to reduce a nitrobody to the corresponding amine, this reduction is a stepwise procedure passing through several intermediate reduction products. These intermediates often deposit on the catalyst and prevent further reduction from occurring in an efficient manner. As a result, large amounts of tars are formed, yields are low and the quality of the final product is poor.

It is an object of this invention to prepare an improved hydrogenation catalyst for the efficient reduction of organic compounds without the formation of the usual tar product which results in low yields and a poor quality product.

It is a further object of this invention to greatly increase the rate of hydrogenation of organic compounds and to obtain improved yields and high quality products by utilizing a highly oleophilic carbon as the support for a noble metal hydrogenation catalyst. It has been found that the rate of hydrogenation can be increased still further if the catalyst supported on the oleophilic carbon is palladium which has been activated by a metal oxide or a metal carbonate.

It is well known to effect a hydrogenation of nitro compounds using platinum or palladium catalysts supported on carbon; however, these conventional carbon supports are porous in nature and are mainly of vegetable or animal origin and are not capable of giving the optimum reduction rates obtained by this invention. It is necessary to draw a distinction between the conventional porous carbons and the highly oleophilic carbon blacks used in the present invention. The oleophilic carbons utilized are characterized by having an oil absorption factor of at least about 200. The porous carbons known in the art are oleophilic to some extent; however, these carbons do not have the large oil absorption factors of the highly oleophilic carbons used in the present invention.

The use of an oleophilic carbon support produces a specific improvement in rate, yield and quality of the end product when said oleophilic carbon has an oil absorption factor of at least about 200. Highly oleophilic carbons are normally non-porous in nature. Porous supports result in a loss of catalyst in the pores and have therefore been found to be less desirable than the use of a non-porous carbon support; however, it is the highly oleophilic character of the carbon support which is the critical factor in the present invention.

Heretofore it was thought desirable to have an extended surface upon which the catalytic metal would be deposited, said surface area ranging from 300 to 1200 sq. meters per gram as measured by nitrogen absorption. The highly oleophilic carbon supports useful in this invention, however, have surface areas ranging from 20 to 100 m.²/g. The activity of the catalyst is directly related to the oil absorbing character of the support. The carbon support utilized should have a very low ash content thus insuring a very high purity and absence of mineral contaminants. Consideration of all these factors leads to the selection of an acetylene black as the preferred highly oleophilic or oil absorbing carbon support for the present invention. This carbon black is non-porous in nature and is sold commercially as Shawinigan acetylene black. It is prepared by thermal decomposition of acetylene and is classified by Drogin and Bishop "Today's Furnace Blacks," United Carbon Company, Inc. (1948, p. 147) as a conductive furnace black. It has an approximate surface area of 60 m.²/g., an ash content of .03% and an oil absorption range of about 200 to 400. The oil absorption factor is the number of pounds of raw linseed oil of acid No. 2 to 4 per 100 lbs. of carbon which causes gelation. This test is the standard method of tests for oil absorption of pigments; ASTM–D–281–31.

The metal catalysts on the highly oleophilic carbon support may be platinum, palladium or a combination thereof. The hydrogenation rate may be increased with promotors or activators. It is known that the presence of additional metals, metal oxides, or even non-metallic compounds improve performance of a catalyst in a reaction of this type. The term "activation" is used to indicate that the catalyst has been improved in performance by having minor amounts of metals or metal oxides, hydroxides, or carbonates combined with the metal catalyst. Activation results in improved hydrogenation rates and greater catalyst life. In the present invention, activation of palladium catalysts is obtained by utilizing the oxides or hydroxides of iron, nickel, cobalt, magnesium, aluminum, manganese, chromium, vanadium, or tungsten, all of which provide an activating influence. Combinations of activators may also be used; and, in addition, the fluorides of boron and silicon may be utilized as activators. Said activator may be added before, during or after precipitation of the palladium from solution as a hydroxide or carbonate. The use of these activators increases the activity of palladium catalysts as much as 400%.

The process of preparing the catalyst of this invention involves first suspending the highly oleophilic carbon in copper-free water. An activator may be added at this point as a water-soluble solution of the activator metal salt; a solution of sodium carbonate or caustic is then added to precipitate the activator metal basic carbonate or hydroxide. A solution of alkali metal bicarbonate is then added at room temperature and a solution of the catalyst metal salt slowly added to the mass. For palladium catalysts, a large excess of bicarbonate may be used since it has been found that such an excess produces a room temperature stable palladium system and results in complete control of the catalyst system.

The following table illustrates the characteristics of a number of oleophilic carbons which may be utilized in this invention:

TABLE I

| Trade-Name of Carbon Black | Approx. Surface Area,[2] m.²/g. | Percent Ash | Particle [3] Diameter, Millimicrons | Oil Absorption Factor [4] |
|---|---|---|---|---|
| Shawinigan Black [1] | 60 | 0.03 | 49.8 | 208 |
| Do. | 60 | 0.03 | 49.8 | 225 |
| Do. | 60 | 0.03 | 49.8 | 250 |
| Do. | 60 | 0.03 | 49.8 | 290 |
| *Shawinigan Black [1] | 60 | 0.03 | 49.8 | 386 |
| Do. | 60 | 0.03 | 49.8 | 395 |

*This carbon black is 50% compressed (bulk density 6.2 lbs./cu. ft.) whereas the other Shawinigan black is 100% compressed (bulk density 12.5 lbs./cu. ft.). Larger volumes of this carbon are required in the preparation of the catalyst because of its lower bulk density.
[1] Conductive furnace black—acetylene carbon black.
[2] Surface area determined by nitrogen absorption isotherm.
[3] Particle diameter: Arithmetic mean diameter measured from electron micrograph.
[4] Oil absorption factor: Pounds of oil required to wet 100 pounds of carbon. Standard rub-out method using raw linseed oil of 2-4 Acid No.

It is preferable that the weight ratio of alkali metal bicarbonate to catalyst metal be between about 15 to 75. After the catalyst metal salt solution is added the mass is heated to about 95° C. and held at this temperature until a test portion, when filtered, shows no catalyst metal dissolved in the filtrate. This procedure assures that all of the catalyst metal has been precipitated. The mass is then reduced. This can be done by the addition of aqueous formaldehyde while holding the mass at about 95° C. or by use of hydrogen or other reducing agents such as glucose, hydrazine, alcohol, glycerine and the like. When using hydrogen the unreduced catalyst mass is filtered off and reduction carried out just prior to using the filtered paste for the hydrogen reduction of nitro compounds.

The concentration of catalyst metal on the oleophilic carbon support should be between about 0.1 and 10% by wt. of the support. The use of low concentrations or "loadings" is desirable for the hydrogenation step, but the higher concentrations are preferred for ease of catalyst preparation. It is preferred to prepare the catalyst at high concentrations, with subsequent "dilutions" to lower loadings. This "dilution" technique involves physical addition and mixing of a low surface oleophilic carbon having an oil absorption capacity of at least about 200 with the catalyst concentrate. The amount of oleophilic carbon added to the catalyst will depend upon the final loading of catalyst metal desired. Preferably, the oleophilic carbon will be added to produce a catalyst having a loading of from about 0.10 to 1% of catalyst metal, based on the weight of the support.

Examples which follow are directed to aqueous and oil phase reduction systems and illustrate the present invention.

*Example I*

A steel or nickel-clad pressure reactor, which is jacketed for heating or cooling with water, and which is equipped with baffles and an efficient agitator that rotates at 800–900 R. P. M., is used for the hydrogen reduction. The reactor is charged to about 20–25% of its capacity with 800 parts of a 62–63% by wt. solution of 2,4-diaminotoluene at 75–85° C. and the catalyst composition containing 0.05–0.10 part of catalyst metal. The autoclave is then pressured with hydrogen to 105 p. s. i. g. and the agitator is started. The temperature of the stirred mixture is adjusted to 80 ±2° C. Molten 2,4-dinitrotoluene is then injected under pressure in portions of approximately 52.8 parts each, to the agitation mass. As the dinitrotoluene is reduced, a drop in pressure is observed due to consumption of the hydrogen. An external hydrogen reservoir limits this pressure drop to about 10 p. s. i. This pressure drop is also accompanied by a rise in temperature. The temperature is controlled between 90 and 110° C. during the reaction by circulation of 78–80° C. water through the jacket. After each portion of dinitrotoluene is reduced, the system is repressured with hydrogen to 105 p. s. i. g. prior to adding another portion of dinitrotoluene. Each portion of the nitro body is practically all hydrogenated before adding the next portion.

To recycle the catalyst, we permit the reduction mass to stand at 75–80° C. without agitation in the reactor and let the bulk of the catalyst settle out. 2,4-diaminotoluene solution (60–62% purity) is then decanted overhead from the settled catalyst. Sufficient liquid, containing about 75–80% of total quantity catalyst, is left in the reactor to provide a "heel" for resuming the reduction operation as described above. Prior to feeding more dinitro body, 0.01 to 0.02 part of new catalytic metal is added to the settled slurry to compensate for catalyst withdrawn in the decanted liquors.

The decanted liquor is filtered from suspended catalyst and water distilled from the resulting 60% solution of the 2,4-diaminotoluene product. The product is finally isolated by distillation under diminished pressure. In this manner, using an iron hydroxide activated palladium catalyst on an acetylene black having an oil absorption factor of 290 and a surface area of 60 m.²/g. and at a palladium loading of about 0.85% on the wt. of the acetylene black support, 5702 parts of 2,4-dinitrotoluene are reduced at 600±50 parts of dinitrotoluene per minute per part of palladium to yield 3660 parts of 2,4-diaminotoluene (96% of theory) boiling at 160–166°/15 mm. and having a freezing point of 96.2° C.

When the above reduction procedure is carried out with conventional catalysts such as those described by Brenner et al., U. S. 2,619,503, the reduction rate is about 30 parts per minute of dinitrotoluene per part of catalyst metal. Further, the yields and purity of the product as produced in the solution are inferior to that obtained by the process of the above example and the amine solution, as produced, cannot be used directly for additional reactions.

*Example II*

A slurry of 56 parts of an acetylene black having an oil absorption factor of 290 is prepared in 1000 parts of copper free water. A solution of 20 parts of sodium bicarbonate in 200 parts of water is added over a 5-minute period. A solution of palladium chloride (previously prepared by dissolving 0.234 part of palladium at 95° C. in 10 parts of 0.55% HCl and then diluted with 50 parts of water) is added dropwise over a 30-minute period.

The mixture is heated to 95° C., agitated and held at this temperature for 30 minutes. Then, 10 parts of 18.5% HCHO solution is added dropwise in 5 minutes while stirring vigorously and holding the temperature at 95° C. for 30 minutes. After cooling to 40° C., the catalyst paste is filtered and washed on the filter with 100 parts of water. The wet paste, consisting of 301.4 parts contains 0.14 part of catalytic palladium (a loading of Pd on carbon of 0.25% dry basis) and can be used directly, without drying as catalyst for the hydrogenation of nitro compounds. When so used as described in Example I, a reduction rate of 167 parts of dinitrotoluene per minute per part of palladium is obtained.

*Example III*

0.7 part of chloroplatinic acid (40% platinum by wt.) is reacted with formaldehyde and sodium bicarbonate and water at 95° C. in the presence of suspension of 28 parts of Shawinigan Black as described in Example II. The yield of catalytic paste is 124.4 parts containing 0.28 part of platinum. This catalyst which has a 1% platinum loading on a dry basis reduces 264–280 parts of dinitrotoluene per minute per part of platinum.

Example IV

Shawinigan Black (33 parts), 23 parts of sodium bicarbonate, 0.6 part of platinous potassium chloride (47% platinum by wt.) and 450 parts of water are stirred and heated at 95° C. for 1½ hours to precipitate platinous hydroxide. The wet paste obtained from the suspension after filtration (145.6 parts) contains 0.28 part of platinum as hydroxide. This is reduced subsequently to colloidal catalytic platinum by hydrogen when used in the nitro body reduction process. The rate of reduction with this composition is 264–210 parts of dinitrotoluene/min./part Pt.

Example V

Fifty-six (56) parts of Shawinigan Black is suspended in 1000 parts of copper-free water under agitation at room temperature. A solution of 0.342 part of ferric chloride ($6H_2O$) (equal to 0.07 part of $Fe^{III}$) dissolved in 100 parts of water is added dropwise in about 10 minutes. A solution of 0.65 part of sodium carbonate dissolved in 50 parts of water is then added dropwise in 15 minutes. This precipitates the iron content as the basic carbonate. Twenty (20) parts of sodium bicarbonate dissolved in 200 parts of water is now added over a period of 5 minutes. A solution of 0.234 part of palladium chloride (equal to 0.14 part of palladium metal previously dissolved at 95° C. in 10 parts of 0.55% (by weight) hydrochloric acid and diluted with 50 parts of water) is then added dropwise in 30 minutes.

The mixture is heated to 95° C. agitated and held at this temperature for 30 minutes. Five (5) parts of 37% formaldehyde diluted with 5 parts of water is added dropwise in 5 minutes while stirring vigorously, and the temperature is maintained at 95° C. for 30 minutes longer. After cooling at 40° C., the catalyst paste is filtered and washed on the filter with 100 parts of water. The wet paste consisting of 301.4 parts, contains 0.14 part of catalytic palladium and can be used directly without drying as catalyst for the hydrogen reduction of organic nitro compounds. This catalyst when used in hydrogen reduction as described in Example I reduces 500 to 590 parts of 2,4-dinitrotoluene per minute per part of palladium.

Example VI

Twenty parts of sodium bicarbonate is dissolved in 350 parts of water at room temperature. A solution of 0.467 part of palladium chloride in 20 parts of 0.55% hydrochloric acid and 20 parts of water is added dropwise over a period of 15–20 minutes to the agitated bicarbonate solution. The resultant solution is yellow in color and its stability is evidenced by the fact that no precipitation takes place after standing several hours. A solution of 1.36 parts of ferric chloride ($6H_2O$) in 30 parts of water is then prepared and added dropwise in 15–20 minutes to 370 parts of a 5.4% sodium bicarbonate solution stirred at room temperature. An orange colored precipitate of basic ferric carbonate is formed. The bicarbonate solution of palladium chloride is then added dropwise over a 20 minute period to the stirred suspension of iron carbonate at room temperature. Twenty-eight parts of Shawinigan Black is then added and the mixture is stirred for 30 minutes. The slurry is now heated while stirring to 95° C. and held at this temperature for one hour prior to filtering the catalyst paste and washing it with 75 parts of water. The filtered liquors are now practically colorless, and tests for palladium show the presence of only trace amounts. The catalyst paste (125 parts) which has a loading of 1% Pd and 1% $Fe^{+3}$ reduces 420–470 parts dinitrotoluene/min./parts Pd.

Example VII

A dispersion of 5.6 parts of Shawinigan Black in 175 parts of water is prepared and 15 parts of sodium bicarbonate added. The mixture is stirred at room temperature for 30 minutes and then a solution of 0.935 part of $PdCl_2$ in 40 ml. of 0.55% HCl (dissolved at 95° C.) and 2.72 parts of $FeCl_3 \cdot 6H_2O$ in 50 parts of water is added. The mixture is heated to 95° C. and held for 1 hour after which it is filtered hot and the precipitate washed with 75 parts of water.

The catalyst paste thus obtained is used in the reduction of 2,4-dinitrotoluene. For this purpose, 2.3 parts of the paste is mixed with 5 parts of Shawinigan Black to give a catalyst having a loading of 0.91% Pd. This catalyst reduces the nitro compound at a rate of about 300 parts of dinitrotoluene per minute per part of palladium.

Example VIII

Shawinigan Black (28 parts), sodium bicarbonate (20 parts) and water (350 parts) are stirred at room temperature. A solution of 0.467 parts palladium chloride
1.00 part ferrous chloride ($4H_2O$) (0.28 part $Fe^{II}$)
20 parts of 0.55% hydrochloric acid
50 parts of water is added to the carbon slurry over a period of 15 minutes. The mass is heated to 95° C. and filtered to collect solids. The latter wet cake representing 1% Pd by weight of the catalyst support is washed with water and used in hydrogen reduction as described in Example I. Reduction rate is 420–470 parts DNT/min./parts Pd.

Example IX

An enamel-lined jacketed kettle is charged with 3000 parts of a salt solution containing 500 parts of sodium chloride. Agitation is started and 46.7 parts of palladium chloride powder is added. The mixture is stirred for 20–30 minutes at 29–30° C. until the palladium chloride is completely dissolved. This technique results in the formation of a chloropalladite solution. Seven thousand (7000) parts of water, 136 parts of ferric chloride hexahydrate and 560 parts of Shawinigan Black are added over a period of 8–10 minutes. The mixture is stirred 15 minutes and 1500 parts of powdered sodium bicarbonate, followed by 500 parts of water (to wash down adhering solids) are added over a period of 5–6 minutes. The mixture after stirring for 30 minutes at 26–27° C. is heated in 30–45 minutes to 90° C. and is held at this temperature until a filtered test portion of its liquors contains no dissolved palladium. This takes about 60 to 75 minutes. The reaction mass is then cooled to 50–60° C. and the solid content of the resultant mixture is collected by filtration. This catalyst paste is washed on the filter with 2000 parts of water and represents a catalyst concentrate having a loading of 5% Pd and 5% $Fe^{+3}$, based on the weight of the carbon. For use in hydrogenation systems it is "diluted" by adding additional oleophilic carbon. For example, addition of Shawinigan Black to the wet paste to give an 0.83% loading of palladium and iron based on the total carbon black content gives this catalyst an activity of 528 parts dinitrotoluene per minute per part of palladium.

Example X 5.6 parts of Shawinigan Black is stirred at room temperature with 100 parts of water containing 10 parts of sodium bicarbonate. A solution of one part of ferrous chloride ($FeCl_2 \cdot 4H_2O$) or 1.36 parts of ferric chloride hexahydrate, is added dropwise in 15 minutes. This is followed by dropwise addition of a solution of 0.42 part of palladium chloride, 0.08 part of chloroplatinic acid in 20 parts of 0.55% hydrochloric acid diluted with 20 parts of water. The slurry is now heated to 95° C. and held at this temperature for one hour. The resultant paste (24 parts) is isolated by filtration and washing with 50 parts of water. The wet catalyst represents a loading on a dry basis of 4.5% Pd, 0.54% Pt and 5%

Fe and when used in reaction with hydrogen by diluting with an added 10 parts of Shawinigan Black for each 8.6 parts of the paste, reduction rate is 700 parts of dinitrotoluene per minute per part of catalyst metal.

Table II, which follows, illustrates one effect of the oleophilic nature of the catalyst support; from this, it is apparent that the high oil absorption factor of carbon blacks reflects a high reduction rate.

TABLE II

| Trade-Name of Carbon Black | Oil Absorption Factor of Carbon | Reduction Rate, parts DNT/min./g. Pd |
|---|---|---|
| (1) 0.25% Pd Loading—Preparative Method: Example II | | |
| Shawinigan Black [1] | 290 | 167 |
| (2) 1.0% Pd Loading—Preparative Method: Example II | | |
| Shawinigan Black [1] | 290 | 20 |
| (3) 1% Pd, 1% $Fe^{III}$ Loading—Preparative Method: Example V | | |
| Shawinigan Black [1] | 290 | 420 |
| *Shawinigan Black [1] | 395 | 530 |
| (4) 0.85% Pd, 0.85% $Fe^{III}$ Loading—Preparative Method: Example VIII | | |
| Shawinigan Black [1] | 290 | 600 |
| (5) 0.77% Pd, 0.09% Pt, 0.85% $Fe^{III}$ Loading—Preparative Method: Example VIII | | |
| Shawinigan Black [1] | 280 | 700 |
| Do | 225 | 700 |
| Do | 250 | 700 |
| Do | 290 | 700 |
| *Shawinigan Black [1] | 386 | 800 |
| Do | 395 | 800 |

[1] Commercially available from Shawinigan Co., Ltd.
*This material is the 50% compressed form and because of its lower bulk density requires somewhat larger volumes in preparation of the catalyst.

*Example XI*

The catalyst of Example IX was used in a 1.4 liter batch reactor to reduce nitrobenzene to aniline. Under reaction conditions of (1) a catalyst concentration of 12–16 parts of palladium metal (as finished catalyst) per million parts of nitrobenzene, (2) a reaction temperature range of 140–160° C., and (3) a hydrogen pressure of 200–1000 lb./sq. in. gage; yields of 97 to 98.5% nitrobenzene to aniline were obtained. Hydrogenation rates of approximately $6.3 \times 10^4$ lb. nitrobenzene per lb. palladium per hour were obtained. Little effect of hydrogenation rate by the partial pressure of hydrogen was obtained above 200 lbs./sq. in. ga. reaction pressure.

Using conventional nickel reduction catalyst on kieselguhr, optimum conditions gave only a reduction rate of 57 lbs./hr. nitrobenzene per lb. of nickel metal and azobenzene, hydrazobenzene and azoxy benzene by products were formed.

The same palladium on oleophilic carbon catalyst was used under similar conditions in a continuous nitrobenzene to aniline reduction process to give 99.9% yield of aniline at reaction rate of $1 \times 10^5$ parts nitrobenzene per hour per part of palladium metal.

*Example XII*

Hydrogen reduction of 4100 parts of 2,6-dinitrotoluene (M. P. 58.5–60.5° C.) added in 20–25 part portions to a water slurry of 20 parts of catalyst paste (containing water, 0.2 part of palladium as palladium hydroxide, 0.2 part iron as ferric hydroxide, 4 parts Shawinigan Black), and 20 parts of dry Shawinigan Black, yields 2493 parts (91% yield) of 2,6-diaminotoluene [B. P. 163.5–164.5° C./15 mm.; M. P. 106.5–108.5° C. (uncorr.); purity= 100% (MW 122) by coupling value.]

*Example XIII*

Hydrogen reduction of 2-nitropropane by addition of 10 part portions of the nitro compound to a slurry of 600 parts of water, 20 parts of catalyst paste as prepared in Example IX and 20 parts of Shawinigan Black at 75° C. under hydrogen pressure of 500-lb./sq. in. (gage) yields, after filtration from catalyst, a solution of 2-aminopropane (isopropylamine) (71% yield). Small amounts of unreduced nitro-body, if present in the amine solution, can be separated by conversion of the amine to its water-soluble hydrochloride or sulfate. Concentration of the amine salt solution, followed by basification, and distillation yields the anhydrous amine B. P. 32–32.5° C. (uncorr.).

*Example XIV*

A mixture of 220 parts nitrobenzene, 10 parts water and 0.75 part of the catalyst prepared and diluted as in Example IX and representing 16 parts palladium metal per million parts nitrobenzene is charged to a 0.7-liter pressure vessel operating at one-third capacity. Hydrogen is bubbled through the mixture at 250 p. s. i. g. for 1 hour, while the temperature is maintained between 140 and 160° C. A product oil containing 163 parts aniline and 0.3 part nitrobenzene forms at a rate of 1030 parts of nitrobenzene reduced per part Pd metal per minute.

*Example XV*

A mixture of 330 parts nitrobenzene and 0.21 parts of the catalyst prepared and diluted as in Example IX representing 3 parts palladium metal per million parts nitrobenzene is charged to a 0.7-liter pressure vessel operating at one-half capacity. Hydrogen is bubbled through the mixture at 250 p. s. i. g. for 1 hour while the temperature is maintained above 170° C. The reaction mixture is maintained water-free by continual removal of the water of reaction as a vapor. A product oil containing 247 parts aniline and less than 1 part nitrobenzene is formed at a rate of 5500 parts nitrobenzene reduced per part Pd metal per minute.

*Example XVI*

A mixture of 500 parts nitrocyclohexane and 8 parts of the catalyst paste of Example X representing 163 parts noble metal per million parts nitrocyclohexane is charged to a 1.4-liter agitated pressure vessel operating at one-third capacity. Hydrogen is bubbled through the mixture at 500 p. s. i. g. for 2 hours while the temperature is maintained at 70° C. A product oil containing 365 parts cyclohexylamine and 10 parts dicyclohexylamine is formed at a rate of 49 parts nitrocyclohexane reduced per part noble metal per minute.

*Example XVII*

A mixture of 250 parts nitrocyclohexane, 250 parts cyclohexylamine and 8 parts of the catalyst paste of Example IX representing 276 parts palladium metal per million parts nitrocyclohexane is charged to a 1.4-liter agitated pressure vessel operating at one-third capacity. Hydrogen is bubbled through the mixture at 250 p. s. i. g. for 1 hour while the temperature is maintained at 125° C. A product oil containing 131 parts cyclohexanone oxime and 270 parts cyclohexylamine is formed at a rate of 36 parts nitrocyclohexane reduced per part Pd metal per minute.

*Example XVIII*

A mixture of 468 parts of 2,4-dinitrotoluene and 1.4 parts of the catalyst prepared and diluted as in Example IX representing 25 parts palladium per million parts 2,4-dinitrotoluene is charged to a 1.4-liter agitated pressure vessel operating at one-half capacity. Hydrogen is bubbled through the mixture at 400 p. s. i. g. for 2 hours while the temperature is controlled at 125 to 150° C. A product oil containing 240 parts 1,2,4-toluene-diamine and 7 parts 2,4-dinitrotoluene is formed at a rate exceeding 258 parts of 2,4-dinitrotoluene reduced to 1,2,4-toluene-diamine per part Pd metal per minute.

*Example XIX*

A glass agitated reaction kettle is charged with 113 parts of 96% $H_2SO_4$, 1025 parts of copper-free water, 0.5 part of C-cetyl betaine and 0.005 part of platinum as deposited on Shawinigan Black at an 0.85% loading on the dry basis. The kettle is flushed with hydrogen and heated to 100° C. while sweeping with a slow stream of hydrogen. The kettle is closed and pressure built up with hydrogen to 200 mm. Hg above atmospheric pressure. Nitrobenzene is then pumped into the reactor in 1.2 part portions while hydrogen gas is fed simultaneously and the pressure maintained at about 200 mm. Hg (gauge) by adjusting the nitrobenzene and hydrogen flow. In this way 0.21 moles of nitrobenzene per hour per liter volume are reduced to yield 74% p-aminophenol and 26% aniline. When the experiment is repeated with conventional platinum catalyst, twice the catalyst concentration must be used to get essentially equivalent results.

*Example XX*

A creased agitated 5-liter flask is charged with 1100 parts of ethyl acetate, 0.03 part of a platinum-palladium catalyst of Example X, 0.01 part of a platinum catalyst deposited on Acetylene Black and reduced with formaldehyde as described in Example III. Hydrogen is introduced into the reactor and trinitrotoluene added in 5 part portions, the temperature of the reaction mass being held at 25 to 30° C. Hydrogen uptake is quantitative. After eight additions of TNT, the reaction mass is heated to 55° C., filtered under a nitrogen atmosphere and the filtrate cooled to give a quantitative yield of colorless triaminotoluene.

In Examples 3-10, 12 and 19, the Shawinigan Black utilized has an oil absorption factor of 290.

By following the essential details of Example XI and using the catalyst of Example X, beta-nitronaphthalene is reduced with hydrogen to beta-aminonaphthalene.

When p-nitroanisole is reduced with hydrogen in a manner similar to that described by Example XI, p-anisidine is formed in good yield.

Using the catalyst of Example IX, the sodium salt of dinitrostilbene disulfonic acid is reduced with hydrogen in a manner similar to that described by Example XIII to give the corresponding diaminostilbene in good yield.

When the dinitrostilbene disulfonic acid sodium salt in the above example is replaced with the sodium salt of p-nitrobenzoic acid, p-aminobenzoic acid is obtained in good yield and quality.

Using the catalyst of Example IX, 5-nitroquinoline is reduced with hydrogen in methanol and in a manner similar to that described in Example XI. After the reduction is completed HCl gas is passed through the filtered reaction medium and the amine dihydrochloride is isolated by cooling and crystallization. A yield of over 85% of 5-aminoquinoline dihydrochloride (M. P. 230–240° C.) is obtained.

*Example XXI*

By eliminating ferric chloride and sodium carbonate from the procedure set forth in Example V, and using 0.71 part of magnesium sulfate dissolved in 100 parts water, the magnesium in the carbon black slurry is precipitated as hydroxide with 72 parts N/10 sodium hydroxide solution prior to addition of sodium bicarbonate and palladium chloride solution, a yield of 306.6 parts of wet catalyst paste results. The reduction rate for this catalyst is 528 parts DNT/min./part Pd.

*Example XXII*

A clean reaction kettle is charged with 240 parts of water, agitation started, and 48 parts of sodium chloride added. When the salt is dissolved, 4.06 parts of palladium chloride and 0.672 part of chloroplatinic acid is added. The mixture is then stirred at 30° C. until complete solution of the noble metals is obtained. At this point, 670 parts of water are added and also 13 parts of ferric chloride hexahydrate, and 53.7 parts of a carbon black having an oil absorption factor of 290 and the mixture is stirred for 15 minutes. To this mixture, 144 parts of sodium bicarbonate are added while using about 48 parts of water to wash any solid material adhering on the sides of the kettle into the reaction mass. The mixture is stirred 30 minutes and heat is then applied, bringing the mixture up to 90° C. in about 1 hour. After 80 to 90 minutes at 90° C. the reaction is considered complete. The reaction mass is then rapidly cooled to 60° C. and filtered. The press cake obtained is washed by displacement with 190 parts of water and sucked fairly dry.

The catalyst paste as prepared in this manner contains a loading on a dry basis of 4.5% palladium, 0.5% platinum, and 5% ferric iron (as hydroxide) and is preferably diluted with highly oleophilic carbon when used as a reduction catalyst. Preferably, this catalyst is diluted with 100 parts of oleophilic carbon having an oil absorption factor of about 290 for each 86 parts of the paste and in the reduction of 2,4-dinitrotoluene, a reduction rate of 700 parts of dinitrotoluene per minute per part of catalyst metal is obtained.

We claim:

1. A hydrogenation catalyst comprising an oleophilic carbon black support having an oil absorption factor of at least about 200, said carbon black having a surface area within the range of 20 to 100 m.$^2$/g., and a noble metal taken from the group consisting of palladium and platinum deposited on its surface at a loading within the range of about 0.1 to 10% by weight of said support.

2. The catalyst of claim 1 taken from the group consisting of palladium and a palladium-platinum mixture; activated with a metal compound taken from the group consisting of a palladium activating metal oxide, hydroxide, basic carbonate and carbonate.

3. A hydrogenation catalyst comprising an oleophilic carbon black support having an oil absorption factor of at least about 200, said carbon black having a surface area within the range of 20 to 100 m.$^2$/g., and a noble metal mixture of palladium and platinum deposited on its surface at a loading within the range of about 0.1 to 10% by weight of said support.

4. The catalyst of claim 3 activated with a metal compound taken from the group consisting of a palladium activating metal oxide, hydroxide, basic carbonate and carbonate.

5. The catalyst of claim 3 activated with an iron compound taken from the group consisting of iron oxide, iron hydroxide and iron carbonate.

6. A process for the reduction of organic nitro compounds wherein an organic nitro compound is mixed with a noble metal catalyst taken from the group consisting of palladium and platinum deposited on an oleophilic carbon black support at a loading within the range of about 0.1 to 10% by weight of said support which has an oil absorption factor of at least about 200, the resulting mixture being reduced with hydrogen.

7. The process of claim 6 wherein the organic compound is nitrobenzene.

8. A process for the reduction of organic nitro compounds wherein an organic nitro compound is mixed with a noble metal catalyst mixture of palladium and platinum which is deposited on an oleophilic carbon black support at a loading within the range of about 0.1 to 10% by weight of said support which has an oil absorption factor of at least about 200, the resulting mixture being reduced with hydrogen.

9. The process of claim 8 wherein the organic compound is 2,4-dinitrotoluene.

10. The process of claim 8 wherein the organic compound is nitrobenzene.

11. The process of claim 8 wherein the catalyst is activated with a metal compound taken from the group consisting of a palladium activating metal oxide, hydroxide, basic carbonate and carbonate.

12. The process of claim 8 wherein the catalyst is activated with an iron compound taken from the group consisting of iron oxide, iron hydroxide and iron carbonate.

13. The process of claim 12 wherein the organic nitro compound reduced is nitrobenzene.

14. The process of claim 12 wherein the organic nitro compound reduced is dinitrotoluene.

References Cited in the file of this patent

UNITED STATES PATENTS

| | | |
|---|---|---|
| 1,084,258 | Ellis | Jan. 13, 1914 |
| 1,271,013 | Bosch et al. | July 2, 1918 |
| 1,456,969 | Brown et al. | May 29, 1923 |
| 1,999,573 | Odell | Apr. 30, 1935 |
| 2,285,277 | Henke et al. | June 2, 1942 |